US011618308B2

(12) United States Patent
Jin et al.

(10) Patent No.: US 11,618,308 B2
(45) Date of Patent: Apr. 4, 2023

(54) HYBRID VEHICLE HAVING AN IMPROVED WATER-COOLED BATTERY LAYOUT

(71) Applicants: HYUNDAI MOTOR COMPANY, Seoul (KR); KIA MOTORS CORPORATION, Seoul (KR)

(72) Inventors: Hyeon Su Jin, Bucheon-si (KR); Kyung Ho Kim, Ansan-si (KR); Min Gyu Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 77 days.

(21) Appl. No.: 16/943,495

(22) Filed: Jul. 30, 2020

(65) Prior Publication Data

US 2021/0178885 A1    Jun. 17, 2021

(30) Foreign Application Priority Data

Dec. 12, 2019 (KR) .................. 10-2019-0165709

(51) Int. Cl.
*B60K 6/00*      (2006.01)
*B60K 6/28*      (2007.10)
*B60K 6/405*     (2007.10)
*B62D 25/20*     (2006.01)
*B60K 11/02*     (2006.01)
*H01M 10/613*    (2014.01)
*H01M 10/625*    (2014.01)
(Continued)

(52) U.S. Cl.
CPC .............. *B60K 6/28* (2013.01); *B60K 6/405* (2013.01); *B60K 11/02* (2013.01); *B62D 25/20* (2013.01); *H01M 10/613* (2015.04); *H01M 10/625* (2015.04); *H01M 10/6556* (2015.04); *H01M 10/6568* (2015.04); *B60Y 2200/92* (2013.01); *B60Y 2306/05* (2013.01); *B60Y 2400/112* (2013.01); *B60Y 2410/10* (2013.01); *H01M 2220/20* (2013.01)

(58) Field of Classification Search
CPC ............. H01M 10/613; H01M 10/625; H01M 10/6556; H01M 10/6551; B60K 6/28; B60K 11/02
See application file for complete search history.

(56) References Cited

U.S. PATENT DOCUMENTS

| 7,560,190 B2 * | 7/2009 | Ahn .................... H01M 10/613 |
| | | 429/120 |
| 8,639,406 B2 * | 1/2014 | Avery .................... B60L 58/21 |
| | | 701/22 |

(Continued)

FOREIGN PATENT DOCUMENTS

KR          101510052 B1     4/2015

*Primary Examiner* — Hau V Phan
(74) *Attorney, Agent, or Firm* — Lempia Summerfield Katz LLC

(57) ABSTRACT

A hybrid vehicle has an improved water-cooled battery layout. The hybrid vehicle includes: a housing positioned in an outdoor space of a vehicle body; a battery for providing an electric driving force to the vehicle and positioned inside the housing; a cooling block disposed below the battery to discharge the heat generated from the battery; a cooling pipe for supplying coolant to the cooling block and formed along an upper portion of the housing; and a cooling nipple formed integrally with the housing to be fastened to the cooling pipe.

7 Claims, 4 Drawing Sheets

(51) Int. Cl.
H01M 10/6556 (2014.01)
H01M 10/6568 (2014.01)

(56) References Cited

U.S. PATENT DOCUMENTS

| | | | | |
|---|---|---|---|---|
| 8,852,772 | B2* | 10/2014 | McDonald | H01M 10/625 |
| | | | | 429/72 |
| 10,164,303 | B2* | 12/2018 | Marcicki | B60K 11/02 |
| 2002/0003417 | A1* | 1/2002 | Bito | B60L 58/12 |
| | | | | 320/152 |
| 2008/0202741 | A1* | 8/2008 | Lee | B60L 58/26 |
| | | | | 165/288 |
| 2009/0068547 | A1* | 3/2009 | Ambrosio | B60L 58/19 |
| | | | | 429/50 |
| 2009/0142653 | A1* | 6/2009 | Okada | H01M 10/647 |
| | | | | 429/120 |
| 2013/0122331 | A1* | 5/2013 | McDonald | H01M 10/6556 |
| | | | | 429/50 |
| 2015/0200426 | A1* | 7/2015 | Maguire | H01M 10/6551 |
| | | | | 429/120 |
| 2016/0093935 | A1* | 3/2016 | Obasih | H01M 10/6566 |
| | | | | 429/71 |
| 2019/0190102 | A1* | 6/2019 | Miura | H01M 10/625 |
| 2019/0232814 | A1* | 8/2019 | Epler | B60L 58/12 |

* cited by examiner

HYBRID VEHICLE HAVING AN IMPROVED WATER-COOLED BATTERY LAYOUT

CROSS-REFERENCE TO RELATED APPLICATION

This application claims under 35 U.S.C. § 119(a) the benefit of priority to Korean Patent Application No. 10-2019-0165709 filed on Dec. 12, 2019, the entire contents of which are incorporated herein by reference.

BACKGROUND

(a) Technical Field

The present disclosure relates to a hybrid vehicle having an improved water-cooled battery layout, and more specifically, to a hybrid vehicle having an improved water-cooled battery layout that mounts a water-cooled battery unit on the outdoor rear surface of a vehicle body and applies an aluminum nipple to a cooling block through which coolant flows, thereby preventing leakage of coolant inside a battery.

(b) Background Art

Recently, with the growing interest in environmental protection, another type vehicle that is eco-friendly and considers fuel efficiency, i.e., a hybrid vehicle or a fuel cell vehicle, is being actively developed as a solution to vehicles using an existing combustion type engine.

Since a hybrid vehicle drives a vehicle with two power sources in connection with an existing engine and a motor driven by electric energy, it is recently becoming the spotlight mainly in the US and Japan as the next generation of a realistic alternative vehicle due to the improvement of fuel economy together with the reduction in the environmental pollution caused by exhaust gas.

In general, the engine driven by gasoline and diesel and the motor as an auxiliary power source are used as power sources of the hybrid vehicle.

In other words, the vehicle runs by using the motor as the power source when operated at low speed and runs by switching the power source to the engine at a certain speed or more.

A battery is used as the power source for driving the motor. Since such a battery operates as an important factor for the life of the electric vehicle as well as the hybrid vehicle, its management should be thoroughly made to efficiently operate the battery.

In particular, a rechargeable battery capable of charging and discharging is widely used as the power for driving the motor such as a hybrid vehicle and an electric vehicle, unlike a primary battery which may not be charged.

However, if the battery is used for a long time, heat is generated from the battery. In particular, in the case of a large-capacity battery, more heat is accompanied by an increase in the amount of current during charging or discharging. If the heat generated at this time is not sufficiently removed, this lowers performance of the battery, or furthermore, causes fire or explosion.

For this reason, in order to maintain and enhance the performance of the battery, cooling of the battery is essential. An air-cooled type cooling apparatus has been mainly used in the conventional battery cooling apparatus.

However, the air-cooled type has a structural problem in that the battery is not uniformly cooled as the air heated at the inlet flows backwards according to the installation position of a cooling fan. There is a limit to apply it to a large-capacity battery because of using the air with low thermal conductivity.

Therefore, in recent years, research on a water-cooled type cooling apparatus has been main-streamed in order to overcome the limitations of the air-cooled type.

In the case of the battery and the water-cooled type cooling apparatus mounted in the interior of the conventional vehicle, there has been a problem of lowering the merchantability due to a narrow internal space in a trunk and the noise of the interior cooling fan. Further, there is a problem in that there is a risk of leakage of the coolant due to the incomplete fastening of a connection unit caused by an assembly operator's mistake by using a quick connector when connecting a water-cooled pipe and a cooling nipple inside the battery.

The above information disclosed in this Background section is only for enhancement of understanding of the background of the disclosure and accordingly it may contain information that does not form the prior art that is already known in this country to a person of ordinary skill in the art.

SUMMARY OF THE DISCLOSURE

The present disclosure is intended to solve the above problems. An object of the present disclosure is to provide a hybrid vehicle having an improved water-cooled battery layout, which changes the mounting position of a high voltage battery in a hybrid vehicle from an existing trunk position to the outdoor rear surface of a vehicle body.

Further, another object of the present disclosure is to provide a hybrid vehicle having an improved water-cooled battery layout, which applies an aluminum nipple to a cooling block through which coolant flows.

The objects of the present disclosure are not limited to the above-described objects, and other objects of the present disclosure, which are not described above, may be understood by the following description, and more clearly understood by the embodiments of the present disclosure. Further, the objects of the present disclosure may be realized by the means and combinations thereof shown in the claims.

A hybrid vehicle having an improved water-cooled battery layout for achieving the objects of the present disclosure includes the following configuration.

An embodiment of the present disclosure provides the hybrid vehicle having the improved water-cooled battery layout. The hybrid vehicle includes: a housing positioned in an outdoor space of a vehicle body; a battery for providing an electric driving force to the vehicle, the battery being positioned inside the housing; a cooling block disposed below the battery to discharge the heat generated from the battery; a cooling pipe for supplying coolant to the cooling block, the cooling pipe being formed along an upper portion of the housing; and a cooling nipple formed integrally with the housing to be fastened to the cooling pipe.

Further, the present disclosure provides the hybrid vehicle having the improved water-cooled battery layout in which the cooling nipple is configured to be made of an aluminum material.

Further, the present disclosure provides the hybrid vehicle having the improved water-cooled battery layout in which the battery includes a first battery and a second battery, and where the cooling nipple is formed to be close to a cooling block below the first battery and a cooling block below the second battery, respectively.

Further, the present disclosure provides the hybrid vehicle having the improved water-cooled battery layout in which a switch unit is positioned between the first battery and the second battery, and where a monitor unit is positioned above the first battery.

Further, the present disclosure provides the hybrid vehicle having the improved water-cooled battery layout in which the housing is configured to include an inlet port for supplying coolant to the cooling block below the first battery and the cooling block below the second battery. The housing is also configured to include an outlet port for discharging the coolant from the cooling block below the first battery and the cooling block below the second battery.

Further, the present disclosure provides the hybrid vehicle having the improved water-cooled battery layout in which the cooling block and the cooling nipple are configured to be connected through brazing welding.

Further, the present disclosure provides the hybrid vehicle having the improved water-cooled battery layout further including a cooling block bracket positioned between the battery and the housing, and in which the cooling block bracket is configured to connect the cooling nipple and the cooling pipe.

Further, the present disclosure provides the hybrid vehicle having the improved water-cooled battery layout configured to have a monitor unit cover for covering the monitor unit on an upper surface of the housing.

Further, the present disclosure provides the hybrid vehicle having the improved water-cooled battery layout in which the monitor unit cover is exposed through an opening of one end of a floor panel of the vehicle body, and where the floor panel of the vehicle body is configured to have a cover for covering the monitor unit cover.

The present disclosure may achieve the following effects by the above-described embodiments and the configuration, the coupling, and the usage relationship to be described below.

In the hybrid vehicle having the improved water-cooled battery layout according to the present disclosure, it is possible to change the mounting position of the high voltage battery from the existing trunk position to the outdoor rear surface of the vehicle body, thereby increasing the capacity of the trunk and reducing the interior noise to increase the merchantability of the vehicle.

Further, it is possible to apply the aluminum nipple to the cooling block through which the coolant flows to ensure the airtightness, thereby preventing the leakage of the coolant inside the battery and securing stability.

It should be understood that the term "vehicle" or "vehicular" or other similar terms as used herein are inclusive of motor vehicles in general. Such motor vehicles may encompass: passenger automobiles including sports utility vehicles (operation SUV), buses, trucks, and various commercial vehicles; watercraft including a variety of boats and ships; aircraft and the like; and alternative fuel vehicles including hybrid vehicles, electric vehicles, plug-in hybrid electric vehicles, and hydrogen-powered vehicles (e.g., fuels derived from resources other than petroleum). As referred to herein, a hybrid vehicle is a vehicle that has two or more sources of power, for example vehicles that are both gasoline-powered and electric-powered.

The above and other features of the disclosure are discussed below.

BRIEF DESCRIPTION OF THE DRAWINGS

The above and other features of the present disclosure are described below in detail with reference to certain embodiments thereof illustrated in the accompanying drawings, which are given hereinbelow by way of illustration only, and thus are not limitative of the present disclosure, and wherein.

Figure 1:
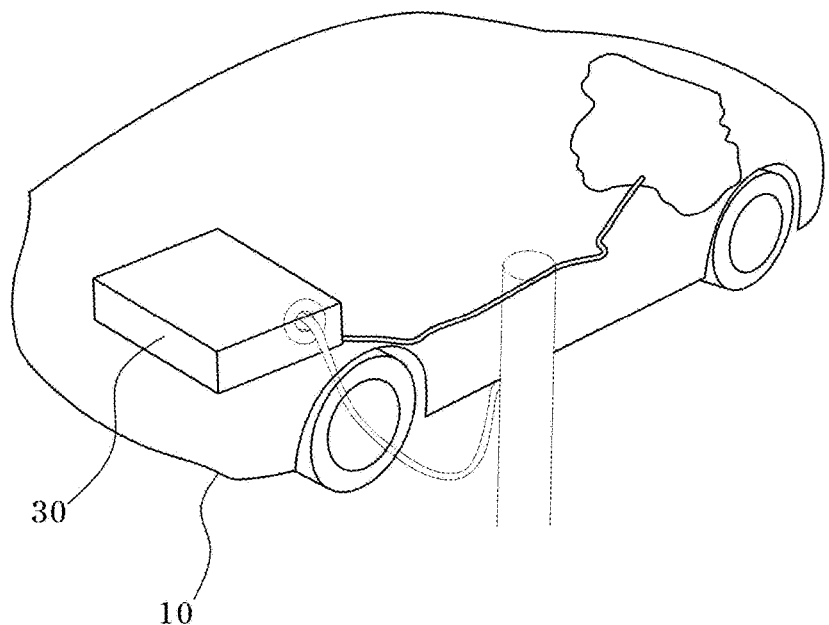
FIG. 1 is a perspective diagram of a vehicle including a battery in a vehicle interior according to the related art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes can be determined in section by the particular intended application and use environment.

In the figures, reference numbers refer to the same or equivalent sections of the present disclosure throughout the several figures of the drawing.

DETAILED DESCRIPTION

Hereinafter, embodiments of the present disclosure are described in more detail with reference to the accompanying drawings. The embodiments of the present disclosure may be modified in various forms, and the scope of the present disclosure should not be construed as being limited to the following embodiments. An embodiment is provided to more completely explain the present disclosure to those having ordinary skill in the art.

Further, terms such as " . . . unit" described in the specification means a unit for processing at least one function or operation, which may be implemented as a combination of hardware.

Further, in this specification, the names of the configurations are divided into first, second, and the like in order to distinguish them because the names of the configurations are the same relationship. The configurations are not necessarily limited to the order denoted by the names in the following description.

In general, a hybrid vehicle in a broad sense means driving a vehicle by efficiently combining two or more different power sources. In most cases, a hybrid vehicle means a vehicle that obtains a driving force by an engine using fuel and an electric motor driven by the power of a battery, which is called a Hybrid Electric Vehicle (HEV).

An electric vehicle means all vehicles that use electricity as a power source and may include a Plug-In Hybrid Electric Vehicle (PHEV), which utilizes a plug using electricity as a portion of a power source. Hereinafter, the hybrid electric vehicle or HEV is called a hybrid vehicle. An embodiment of the disclosure may be a hybrid vehicle having two, three or more rows of seats.

FIG. 1 is a perspective diagram of a vehicle including a battery in a vehicle interior according to the related art.

As shown in FIG. 1, a conventional battery is installed below the rear seat or in a trunk, which is an internal space of a vehicle body that does not require water tightness. In this case, the rear seat is raised which limits the interior space, or the space utilization of the trunk is reduced. Further, a pipe receiving coolant from the outside of the vehicle is configured to be connected to the vehicle interior by mounting the battery in the interior. In this case, if the coolant is leaked into the battery, there is a risk of fire.

Figure 2:
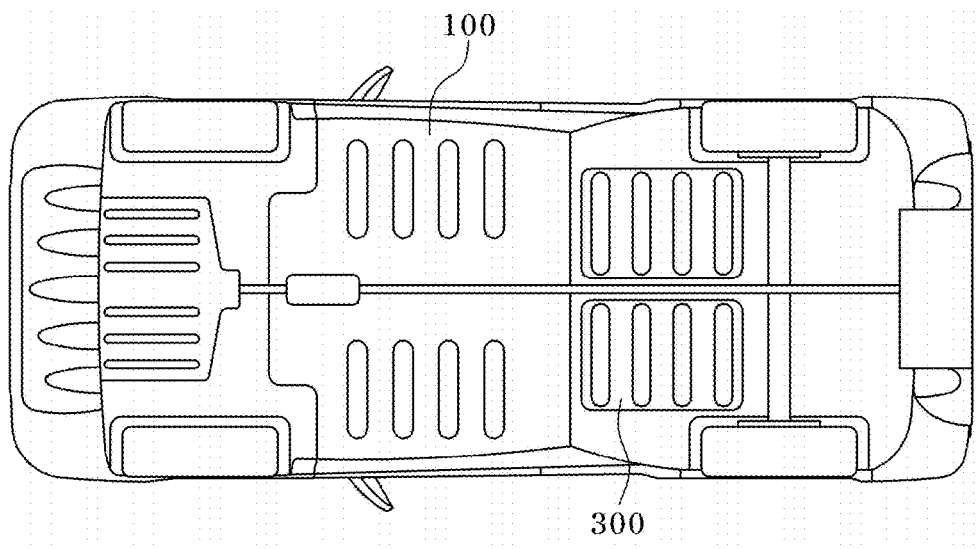
FIG. 2 is a rear diagram of a hybrid vehicle having an improved water-cooled battery layout according to an embodiment of the present disclosure.
Figure 3:
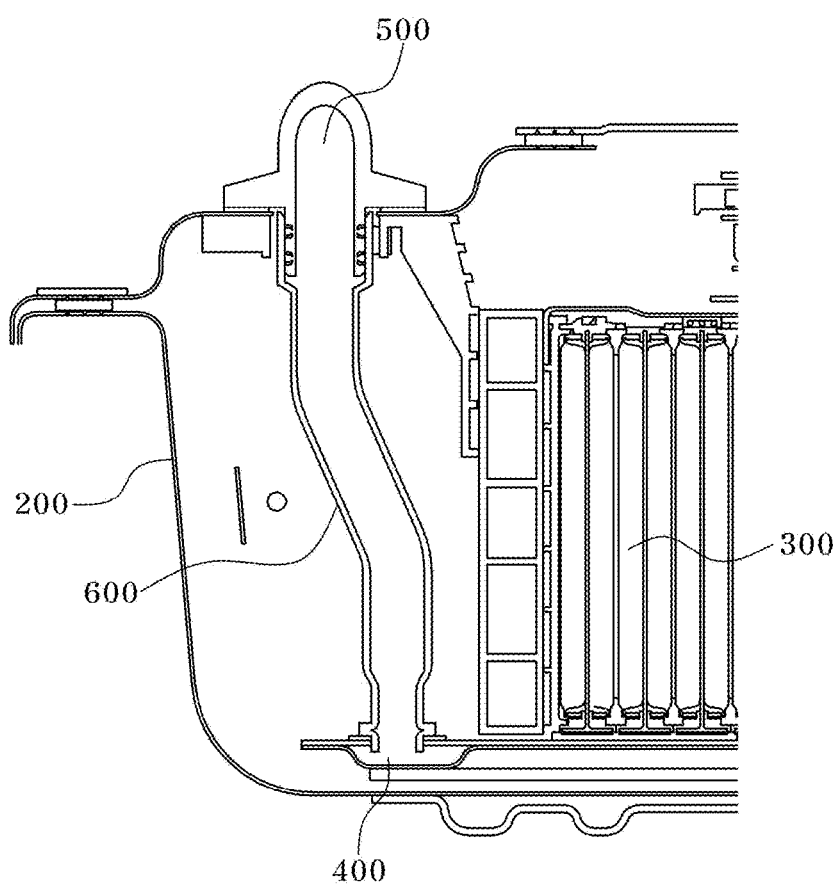
FIG. 3 is a diagram showing a configuration of the hybrid vehicle having the water-cooled battery layout according to an embodiment of the present disclosure.

FIG. 2 is a rear diagram of a hybrid vehicle having an improved water-cooled battery layout according to an embodiment of the present disclosure. FIG. 3 is a diagram showing a configuration of the hybrid vehicle having the improved water-cooled battery layout according to an embodiment of the present disclosure.

Referring to FIGS. 2 and 3, a hybrid vehicle having an improved water-cooled battery layout according to an embodiment of the present disclosure may be configured to include a housing 200 positioned in an outdoor space of a vehicle body 100, a battery 300 for providing an electric driving force to the vehicle and positioned inside the housing 200, a cooling block 400 disposed below the battery 300 to discharge the heat generated from the battery 300, a cooling pipe 500 for providing coolant to the cooling block 400 and formed along the upper portion of the housing 200, and a cooling nipple 600 formed integrally with the housing 200 to be fastened to the cooling pipe 500.

The housing 200 may be positioned in an outdoor space of the vehicle body 100. In one example, the housing 200 may be positioned in a region recessed upwards on the outdoor rear surface of the vehicle body 100 below the rear seat of the vehicle. A shape in which the vehicle body 100 has been recessed upwards may be formed to correspond to the shape of the housing 200. As a result, if the housing 200 is inserted from below to above, a separate space between the vehicle body 100 and the housing 200 may be reduced as much as possible.

The housing 200 may be fixed to a floor panel of the vehicle body 100 through a mounting bracket. The center portion of the housing 200 may be formed in a tunnel shape so that an exhaust pipe may be positioned therein. A heat protector for preventing deterioration due to exhaust heat may be formed at a position adjacent to the exhaust pipe.

If the high voltage battery 300 is mounted below the trunk, the capacity or space of the trunk being used for various purposes is reduced, and it is practically impossible to mount a spare tire due to this reduction. The present disclosure may install the housing 200 in the lower outdoor space of the rear seat corresponding to the unusable space in the hybrid vehicle, thereby maximizing the space of the trunk as compared with the conventional structure in which the battery 300 is installed in the trunk. As a result, it is possible to improve the merchantability of the vehicle and improve the convenience of the user.

The battery 300 may be positioned inside the housing 200. The battery 300 is configured to store electric energy and may provide an electric driving force to the vehicle.

The battery 300 may be directly charged through an external power source. The battery 300 may also be charged by a power conversion system such as an inverter for a drive motor, a low voltage step-down DC-DC converter, a boost DC-DC converter, or a built-in charger. In particular, the battery 300 may be divided into one or more batteries so as to be connected with one or more alternators, respectively.

Types of the battery 300 may be a lead acid battery, a nickel-hydrogen (Ni-MH) battery, a lithium-ion (Li-ion) battery, a nickel-cadmium (Ni—Cd) battery, a lithium-polymer (Li-polymer) battery, an air-Zn battery, a sodium-sulfur (Na—S) battery, and a sodium-nickel chloride (Na—NiCl$_2$) battery. However, the present disclosure is not particularly limited thereto.

The cooling block 400 may be disposed below the battery 300. In one example, the cooling block 400 may be installed between the lower portion of the battery 300 and the housing 200 to serve to discharge the heat generated from the battery 300.

The cooling block 400 may accommodate the coolant therein and may be disposed below the battery 300 to discharge the heat generated from the battery 300. The length of the cooling block 400 may be formed to be equal to or slightly larger than the length of the battery 300 formed by stacking a plurality of battery cells. The width of the cooling block 400 may be formed to be equal to or relatively smaller than the width of the battery 300.

In another embodiment of the present disclosure, the cooling block 400 may be formed smaller in order to be disposed in plural on the upper portion, left and right-side surfaces, or the like of the battery 300. Therefore, the number of cooling blocks 400 may be increased, thereby discharging the heat generated from the battery 300 more efficiently.

The cooling block 400 may be made of a material having excellent thermal conductivity such as aluminum alloy and copper so as to efficiently absorb the heat generated from the battery 300. The cooling block 400 may directly contact the battery 300 but may also indirectly contact it to absorb the heat.

The cooling pipe 500 may be formed along the upper portion of the housing 200. Further, the cooling nipple 600 may be formed integrally with the housing 200 to be fastened to the cooling pipe 500. When supplying the coolant to the cooling block 400 through the cooling pipe 500, the cooling nipple 600 may be applied to supply the coolant without applying a separate tube or quick connector. In this regard, increasing the weight of the vehicle may be minimized.

In one example, the cooling pipe 500 may be connected to the upper portion of the housing 200. The cooling nipple 600 may be formed corresponding to a position where the cooling pipe 500 has been connected to the housing 200. One end of the cooling nipple 600 may be connected with the cooling pipe 500 and the other end thereof may be connected with the cooling block 400. The cooling block 400 and the cooling nipple 600 may be connected through brazing welding.

The cooling nipple 600 may be configured to be made of an aluminum material. The cooling nipple 600 of an aluminum material may be easily connected with the cooling pipe 500 and the cooling block 400 and may efficiently deliver the temperature of the coolant.

Figure 4:
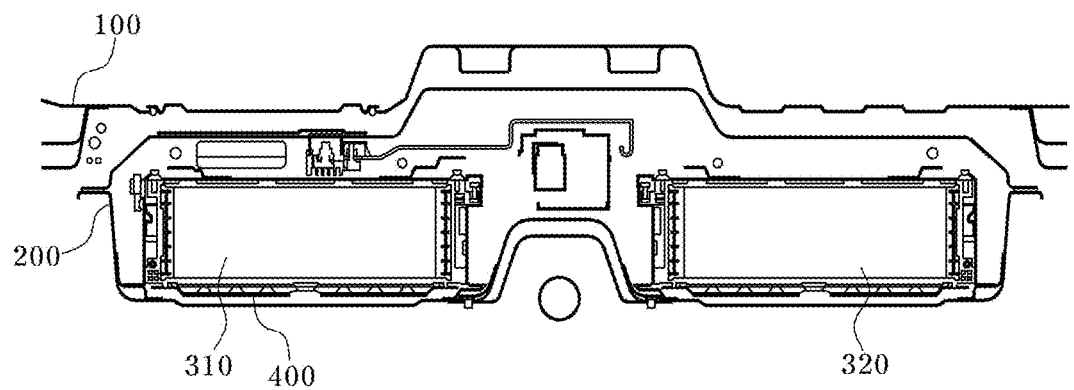
FIG. 4 is a cross-sectional diagram of the interior of a housing of the hybrid vehicle having the water-cooled battery layout according to an embodiment of the present disclosure.

FIG. 4 is a cross-sectional diagram showing the interior of the housing 200 of the hybrid vehicle having the improved water-cooled battery layout according to an embodiment of the present disclosure.

Referring to FIG. 4, the battery 300 according to an embodiment of the present disclosure is composed of a first battery 310 and a second battery 320. The cooling nipple 600 may be formed to be close to the cooling block 400 below the first battery 310 and the cooling block 400 below the second battery 320, respectively.

When the conventional cooling blocks are connected to each other, it has been configured to connect between the cooling blocks disposed corresponding to each battery by applying a separate quick connector and a cooling nipple. In this case, since a separate assembly of the quick connector is required, there has been a risk of fire due to leakage of coolant upon incomplete assembly.

In an embodiment of the present disclosure, the cooling pipe 500 may be connected with each cooling block 400 through the cooling nipple 600 to connect the cooling blocks 400 even without applying a separate tube and quick connector for the connection between the cooling blocks 400. In one example, the cooling nipple 600 formed to be close to the cooling block 400 is disposed below the first battery 310 and the cooling nipple 600 formed to be close to the cooling block 400 is disposed below the second battery 320, respectively. As a result, it is possible to secure safety from the risk of fire due to leakage of coolant.

Figure 5:
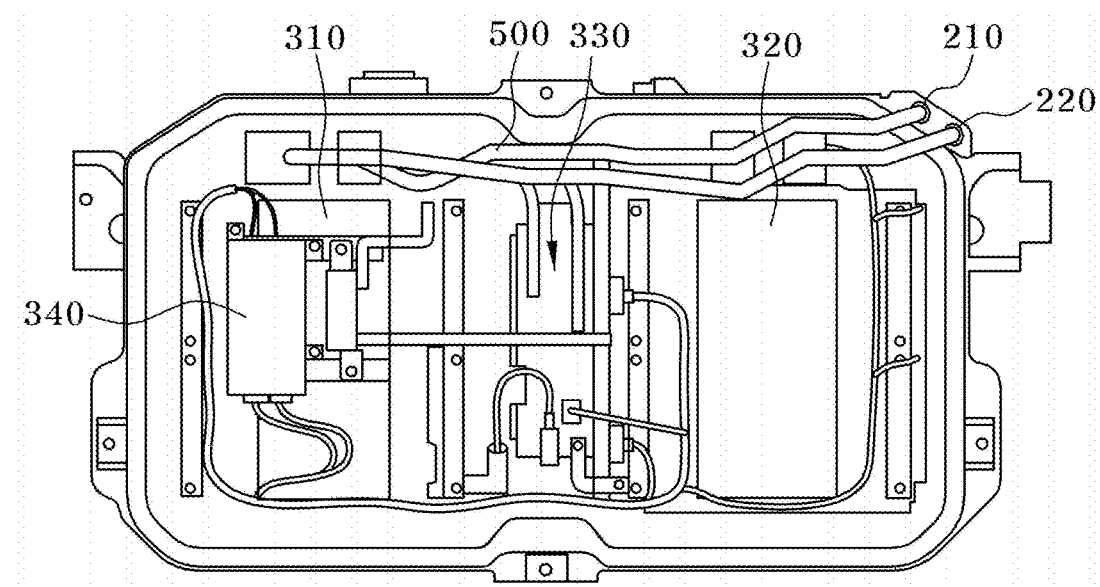
FIG. 5 is a diagram showing an upper portion of the housing of the hybrid vehicle having the water-cooled battery layout according to an embodiment of the present disclosure.

FIG. 5 is a diagram showing the upper portion of a housing of the hybrid vehicle having the improved water-cooled battery layout according to an embodiment of the present disclosure.

Referring to FIG. 5, the hybrid vehicle having the improved water-cooled battery layout according to an embodiment of the present disclosure may be configured to have a switch unit 330 positioned in a space between the first battery 310 and the second battery 320, and to have a monitor unit 340 positioned above the first battery 310. Further, the housing 200 may be configured to include an inlet port 210 for supplying coolant to the cooling block 400 below the first battery 310 and the cooling block 400 below the second battery 320 and an outlet port 220 for discharging the coolant from the cooling block 400 below the first battery 310 and the cooling block 400 below the second battery 320.

The switch unit 330 may be positioned in a space between the first battery 310 and the second battery 320. In one example, the switch unit 330 may be formed inside the housing 200 between the first battery 310 and the second battery 320. The switch unit 330 may be configured as a Power Relay Assembly (hereinafter, PRA). The switch unit 330, as a PRA, is a device which is positioned between the large-capacity high voltage battery 300 used in an Electric Vehicle (EV) to be in charge of its connection and may include a relay, a resistor, and the like. The PRA may be composed of a (+), (−) main relay, a pre-charge relay, a pre-charge resistor, and a battery current sensor. The PRA may control a high voltage power supply circuit of an inverter by the control signals of the battery and the monitor unit.

The monitor unit 340 may be positioned above the first battery 310. In one example, the monitor unit 340 may be disposed inside the upper housing 200 of the first battery 310. The monitor unit 340 may be a Battery Management System (hereinafter, BMS) board. The monitor unit 340 may manage the optimized battery 300, increase energy efficiency, and extend the life of the battery 300. Further, the monitor unit 340 may serve to monitor the voltage, current, temperature, and the like of the battery 300 in real time, thereby preventing excessive charging and discharging, and increasing the stability and reliability of the battery 300.

The inlet port 210 may be configured to be connected to the upper portion of the housing 200. In one example, the inlet port 210 may be connected to the housing 200 so as to correspond to one end of the cooling pipe 500 positioned on the upper portion of the housing 200. The coolant may be supplied to the cooling block 400 below the first battery 310 and the cooling block 400 below the second battery 320 through the inlet port 210.

The outlet port 220 may be configured to be connected to the upper portion of the housing 200 adjacent to the inlet port 210. In one example, the outlet port 220 may be connected to the housing 200 so as to correspond to one end of the cooling pipe 500 positioned on the upper portion of the housing 200. It may be configured so that the coolant may be discharged from the cooling block 400 below the first battery 310 and the cooling block 400 below the second battery 320 through the outlet port 220.

The coolant may easily flow into the cooling block 400 through the inlet port 210. The coolant may be easily discharged from the cooling block 400 to the outside through the outlet port 220.

Figure 6:
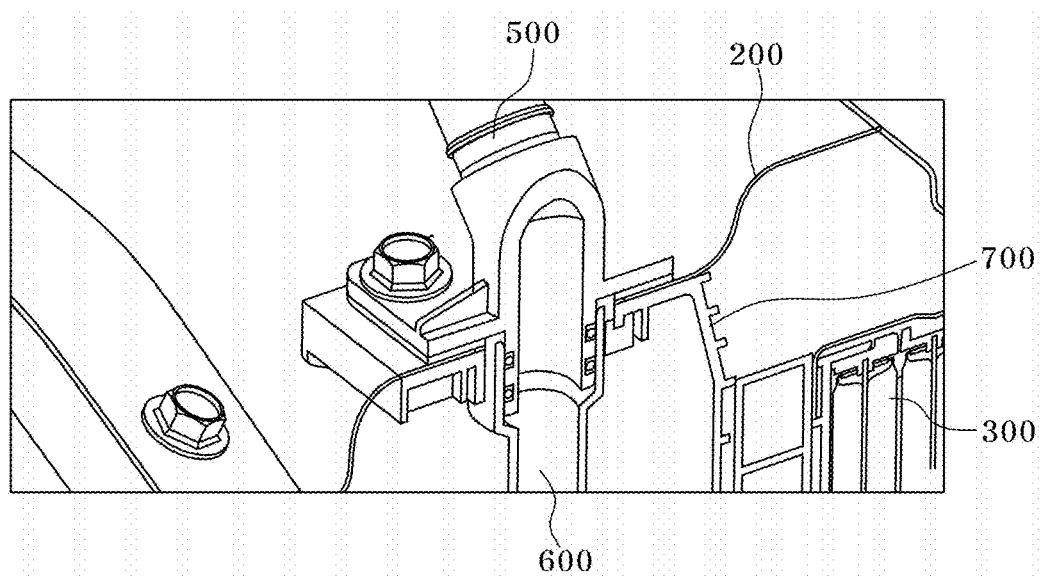
FIG. 6 is a diagram showing a cooling block bracket of the hybrid vehicle having the water-cooled battery layout according to an embodiment of the present disclosure.

FIG. 6 is a diagram showing a cooling block bracket of the hybrid vehicle having the improved water-cooled battery layout according to an embodiment of the present disclosure.

Referring to FIG. 6, the hybrid vehicle having an improved water-cooled battery layout according to an embodiment of the present disclosure further includes a cooling block bracket 700 positioned between the battery 300 and the housing 200. The cooling block bracket 700 may be configured to connect the cooling nipple 600 and the cooling pipe 500.

One end of the cooling nipple 600 may be connected with the cooling pipe 500. In one example, the cooling pipe 500 and the cooling nipple 600 may be connected in a double O-ring structure, a watertight gasket and a bolting coupling structure, and the cooling block bracket 700 may be formed adjacent to the double O-ring structure.

The cooling block bracket 700 may be structurally connected between the upper portion of the housing 200 and the battery 300, thereby increasing mechanical robustness.

Figure 7:
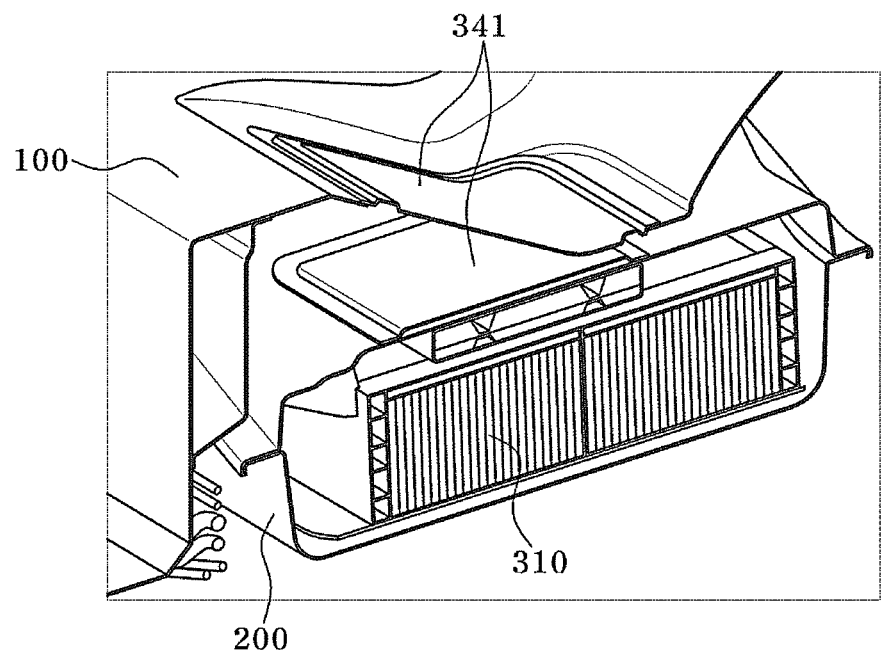
FIG. 7 is a diagram showing a cover of a monitor unit of the hybrid vehicle having the water-cooled battery layout according to an embodiment of the present disclosure.

FIG. 7 is a diagram showing a cover of the monitor unit of the hybrid vehicle having the improved water-cooled battery layout according to an embodiment of the present disclosure.

Referring to FIG. 7, the hybrid vehicle having the improved water-cooled battery layout according to an embodiment of the present disclosure may be configured to include a monitor unit cover 341 for covering the monitor unit 340 on the upper surface of the housing 200. Further, the monitor unit cover 341 may be exposed through an opening of one end of the floor panel of the vehicle body 100. The floor panel of the vehicle body 100 may be configured to include a cover for a monitor unit cover for covering the monitor unit cover 341.

In the present disclosure, the monitor unit cover 341 may be configured separately so that repair may be performed by replacing only a relevant single unit upon detecting a failure. In one example, it may be configured to replace the BMS related component by opening the monitor unit cover 341 upon detecting a BMS related failure. Therefore, it is possible to reduce the related costs and shorten the time spent on repairs.

The monitor unit cover 341 may be formed on the upper surface of the housing 200 and one end of the floor panel of the vehicle body 100. In one example, the monitor unit cover 341 may be formed on the housing 200 and the floor panel of the vehicle body 100 at positions corresponding to the monitor unit 340, respectively. If a component is broken or requires maintenance, it may be configured so that maintenance is possible by opening only the monitor unit cover 341.

It is possible to dispose the monitor unit 340 above the battery 300 and to additionally apply the monitor unit cover 341 to the floor panel itself of the vehicle body 100, thereby securing maintenance.

In summary, the present disclosure provides the hybrid vehicle having the improved water-cooled battery layout, which may change the mounting position of the high-voltage battery 300 from the existing trunk position to the outdoor rear surface of the vehicle body 100, thereby increasing the capacity of the trunk, and reducing the interior noise to increase the merchantability of the vehicle. Further, the present disclosure provides the hybrid vehicle having the improved water-cooled battery layout, which may apply the aluminum cooling nipple 600 to the cooling block 400 through which the coolant flows to secure air tightness, thereby preventing leakage of the coolant inside the battery 300 and ensuring stability.

The foregoing detailed description illustrates the present disclosure. Further, the above-described contents show and explain embodiments of the present disclosure, and the present disclosure may be used in various other combinations, modifications, and environments. In other words, changes or modifications may be made within the scope of the concept of the disclosure disclosed in this specification, the scope equivalent to the disclosed contents, and/or the technology or knowledge in the art. The described embodiments describe the best mode for implementing the technical spirit of the present disclosure, and various modifications required in the specific application field and use of the present disclosure are also possible. Therefore, the above-described detailed description is not intended to limit the present disclosure to the disclosed embodiments. Further, the appended claims should be construed to also include other embodiments.

What is claimed is:

1. A hybrid vehicle having an improved water-cooled battery layout, the hybrid vehicle comprising:
    a housing positioned in an outdoor space of a vehicle body;
    a battery for providing an electric driving force to the vehicle, the battery being positioned inside the housing;
    a cooling block disposed below the battery to discharge heat generated from the battery;
    a cooling pipe for supplying coolant to the cooling block, the cooling pipe being formed along an upper portion of the housing; and
    a cooling nipple formed integrally with the housing to be fastened to the cooling pipe;
    wherein the battery comprises a first battery and a second battery,
    wherein a monitor unit is positioned above the first battery,
    wherein a monitor unit cover covers the monitor unit on an upper surface of the housing,
    wherein the monitor unit cover is exposed through an opening of one end of a floor panel of the vehicle body, and
    wherein the floor panel of the vehicle body is configured to have a cover for covering the monitor unit cover.

2. The hybrid vehicle of claim 1,
    wherein the cooling nipple is configured to be made of an aluminum material.

3. The hybrid vehicle of claim 1,
    wherein the cooling nipple is formed to be close to a cooling block below the first battery and a cooling block below the second battery, respectively.

4. The hybrid vehicle of claim 3,
    wherein a switch unit is positioned between the first battery and the second battery.

5. The hybrid vehicle of claim 3,
    wherein the housing comprises:
        an inlet port for supplying coolant to the cooling block below the first battery and the cooling block below the second battery; and
        an outlet port for discharging the coolant from the cooling block below the first battery and the cooling block below the second battery.

6. The hybrid vehicle of claim 1,
    wherein the cooling block and the cooling nipple are configured to be connected through brazing welding.

7. The hybrid vehicle of claim 1, further comprising a cooling block bracket positioned between the battery and the housing,
    wherein the cooling block bracket is configured to connect the cooling nipple and the cooling pipe.

* * * * *